(12) United States Patent
Martin et al.

(10) Patent No.: US 12,722,573 B2
(45) Date of Patent: Sep. 1, 2026

(54) ATTACHMENT ASSEMBLIES, ATTACHMENTS, ATTACHMENT HARDWARE FOR SECURING ACCESSORIES TO WINDOW FRAMES OF VEHICLES, AND RELATED METHODS

(71) Applicant: SOUTH EAST MANUFACTURING, INC., Wilson, NC (US)

(72) Inventors: Nicholas Martin, New Bern, NC (US); Timothy Martin, New Bern, NC (US); Zachary Hall, Lucama, NC (US)

(73) Assignee: BARNES METALCRAFTERS, INC., Wilson, NC (US)

( * ) Notice: Subject to any disclaimer, the term of this patent is extended or adjusted under 35 U.S.C. 154(b) by 509 days.

(21) Appl. No.: 18/350,574

(22) Filed: Jul. 11, 2023

(65) Prior Publication Data

US 2024/0010132 A1 Jan. 11, 2024

Related U.S. Application Data

(60) Provisional application No. 63/388,035, filed on Jul. 11, 2022.

(51) Int. Cl.
*B60R 7/04* (2006.01)
*B60R 11/00* (2006.01)

(52) U.S. Cl.
CPC ................ *B60R 7/046* (2013.01); *B60R 7/04* (2013.01); *B60R 2011/0026* (2013.01);
(Continued)

(58) Field of Classification Search
CPC ... B60R 7/04; B60R 7/046; B60R 2011/0052; B60R 2011/0059; B60R 2011/0061;
(Continued)

(56) References Cited

U.S. PATENT DOCUMENTS 6,401,994 B1 * 6/2002 Ham ......................... B60R 7/14 109/51
6,626,480 B2 * 9/2003 Anderson ............... B60R 11/06 224/404

(Continued)

FOREIGN PATENT DOCUMENTS

GB 2511609 A * 9/2014 ............. B60R 11/00

*Primary Examiner* — Jason S Morrow
(74) *Attorney, Agent, or Firm* — Michael Best & Friedrich LLP

(57) ABSTRACT

Attachments, attachment hardware for securing attachments to a window frame of a vehicle and related methods are provided herein. The attachment hardware can comprise a nut and a T-shaped washer comprising a top cross-bar section and a stem section. The T-shaped washer can have a washer aperture therethrough. The attachment hardware can also comprise a fastener side washer having a washer aperture therethrough and a threaded fastener configured for insertion through the washer apertures of the fastener side washer and the T-shaped washer for engaging the nut. The top cross-bar section and the stem section of the T-shaped washer can fit through an engagement aperture in a tab extending from a frame of a windshield when turned at an angle to the engagement aperture and have a shape that contacts an upper wall of the tab that defines the engagement aperture.

22 Claims, 12 Drawing Sheets

(52) U.S. Cl.
CPC ................. *B60R 2011/0052* (2013.01); *B60R 2011/0061* (2013.01); *B60R 2011/0066* (2013.01)

(58) Field of Classification Search
CPC ..... B60R 2011/0078; B60R 2011/0026; B60R 2011/0066
USPC .......................................................... 224/482
See application file for complete search history.

(56) References Cited

U.S. PATENT DOCUMENTS

| | | | | |
|---|---|---|---|---|
| 8,052,019 | B2 * | 11/2011 | Plavetich | B60P 7/0815<br>224/543 |
| 10,239,466 | B2 * | 3/2019 | Campbell | F16B 39/24 |
| 10,280,967 | B2 * | 5/2019 | Tashiro | H02G 3/081 |
| 10,427,616 | B2 * | 10/2019 | Wilckens | B60R 11/00 |
| 10,520,795 | B2 * | 12/2019 | Wine | A44B 99/005 |
| 11,021,227 | B2 * | 6/2021 | Zúñiga | B64C 3/34 |
| 2012/0132684 | A1 * | 5/2012 | Ardigo | B60N 2/78<br>224/545 |
| 2016/0281402 | A1 * | 9/2016 | Agnew | B60J 1/2094 |
| 2017/0274745 | A1 * | 9/2017 | Lewis | B60R 7/02 |
| 2018/0118127 | A1 * | 5/2018 | Wymore | B60R 9/04 |

* cited by examiner 40
52
T
34
RC
C
50
30
22
32
WF
52
50
40
V
24
28
22
20
24
20A

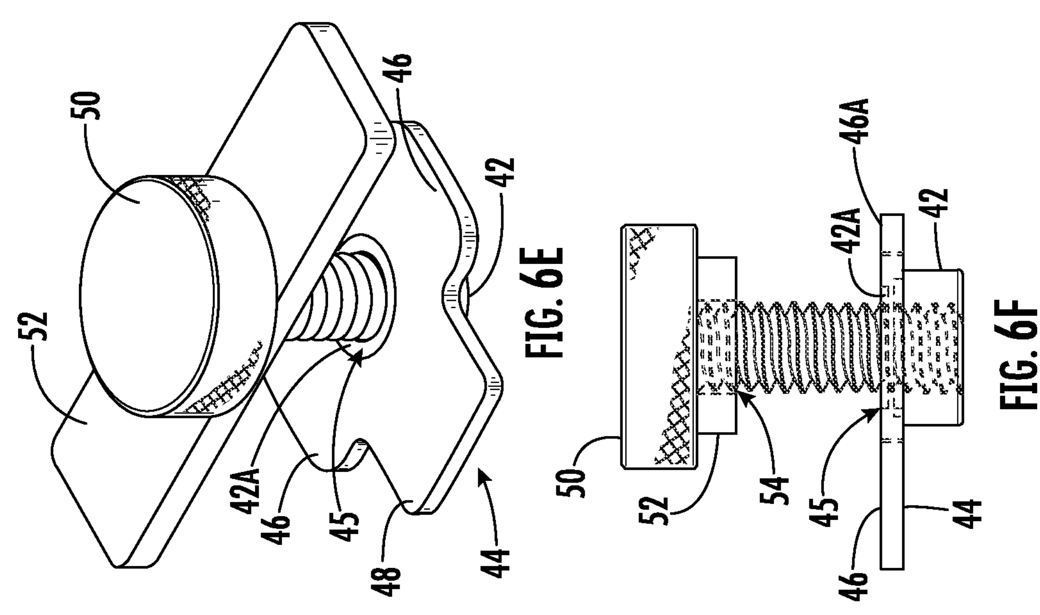
FIG. 6E
FIG. 6F
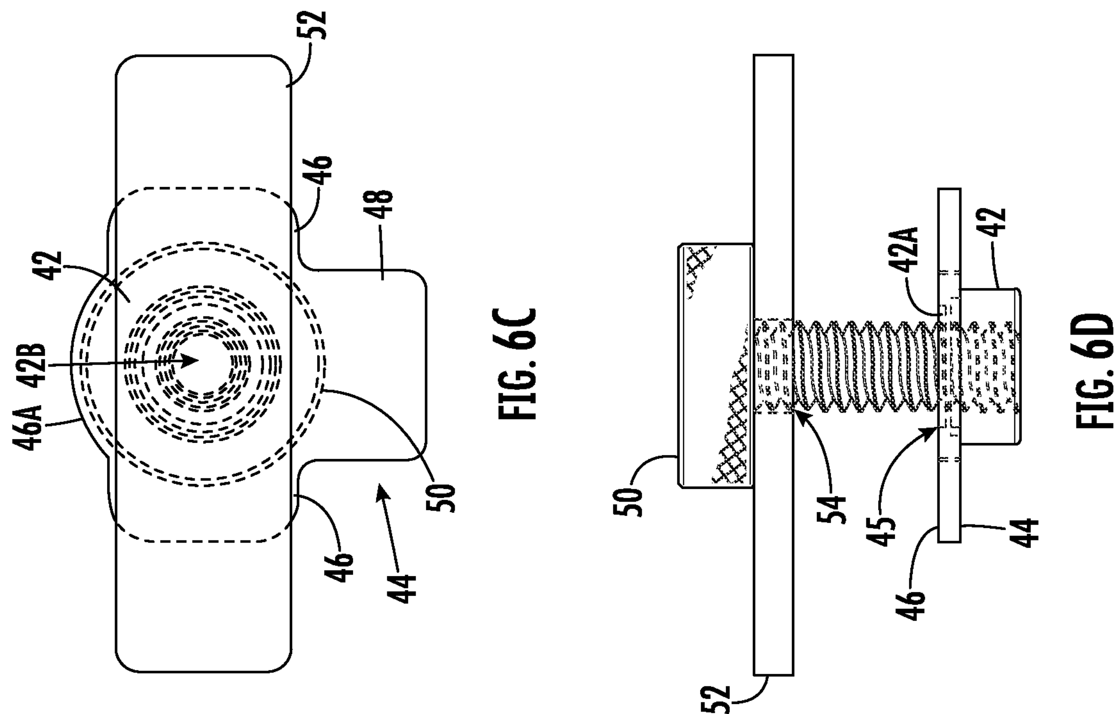
FIG. 6C
FIG. 6D

V
WF
40
30
U
T
52
A
44
AB
RC
50
38
42
U 50
52
30
T
A
A
RC
20A
24
40
22
20
22

40
30
C
C
RC
24
T
AB
44
42
RC
AB

ATTACHMENT ASSEMBLIES, ATTACHMENTS, ATTACHMENT HARDWARE FOR SECURING ACCESSORIES TO WINDOW FRAMES OF VEHICLES, AND RELATED METHODS

RELATED APPLICATION

The presently disclosed subject matter claims the benefit of U.S. Provisional Patent Application Ser. No. 63/388,035, filed Jul. 11, 2022, the disclosure of which is incorporated herein by reference in its entirety.

TECHNICAL FIELD

The present subject matter relates to attachment assemblies, attachments, and attachment hardware for securing accessories to window frames of vehicles and related methods. In particular, the present subject matter relates to attachment hardware for securing accessories such as mountable products that can include baskets, fire extinguisher holders, light frames, MOLLE panels, radio mount, or the like, to window frames of front windshields of vehicles.

BACKGROUND

Sports Utility Vehicles ("SUVs") have gained tremendous popularity over the past several years and have quickly become one of the most common body types you will see on the road. A big reason why SUVs are so popular is due to versatility and cargo space. Smaller SUVs are great for commuters or small families that need a bit more room than a sedan or hatchback can provide. Many SUVs offer even more space inside the cabin, with a large range of sizes available, including compact and full-size mode. SUVs also tend to offer a wide range of drivetrain options. Front-wheel drive is common as an affordable and fuel-efficient option for drivers. All-wheel drive is a popular choice among SUV drivers in that it helps them handle the vehicle easier in slippery road conditions. Some SUVs offer rear-wheel drive. For drivers how enjoy outdoor activities, many SUVs offer four-wheel drive for enhanced performance.

Some SUVs, such as Jeeps® and the new Ford Broncos®, have been designed to be highly customizable with modular designs that permit companies to provide aftermarket parts and additional components that add features no offered on the respective vehicles by the manufacturer. For example, off-road modular SUV designs offer a user-friendly platform that can be stripped to its base structure so that alternate doors, fenders, and grille can be added in one afternoon. The following day, a whole new SUV can be reconfigured for another new adventure with a different body and roof setup. Such SUVs were designed and engineered from a clean slate to make off-road customization easy, quick, and attainable for all enthusiasts with a wide variety of interests and skill levels.

One area of design that is lacking in the many vehicles is storage and item holding capabilities that are accessible to both the driver and front seat passenger. For example, there is no easily accessible place for store sunglasses. Many other vehicles have a compartment on the interior ceiling of the roof near the windshield designed specifically to hold sunglasses so that they can easily access when a driver seats in the driver seat.

Additionally, due to the customizablility available in many vehicles, a wide range of uses from regular transportation needs to off road adventuring in different environments, including, desert, beach, mountain, mud, and rocky environments, other possible accessible storage needs can arise. These accessible storage needs can include fire extinguisher holders, flashlight holder, overhead or dome lighting, or a lockable safe. Other accessible storage needs can include attachment of an overhead MOLLE (modular lightweight load-carrying equipment) panel, a mount for radio such as a CB, and a mount for auxiliary or other accessory switches for accessories added during the customization of the SUV.

As such, a need exists for attachments and attachment hardware to secure attachments to the window frames of front windshields of sport utility vehicles.

SUMMARY

The present subject matter relates to attachment assemblies, attachments, and attachment hardware for securing accessories, i.e., mountable products, to window frames of vehicles and related methods. In particular, the present subject matter relates to attachment hardware for securing mountable products such as baskets, fire extinguisher holders, lights, light frames, MOLLE panels, radio mount, or the like, to window frames of front windshields of vehicles. Methods related to the use of the assembly and of the attachments and attachment hardware disclosed herein are also provided.

Thus, it is an object of the presently disclosed subject matter to provide attachment assemblies, attachments, and attachment hardware for securing accessories to window frames of vehicles as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIGS. 6A-6F illustrate different views of an embodiment of an attachment hardware used to securely mount a mountable product to a window frame of a vehicle according to the present subject matter;

Figure 1:
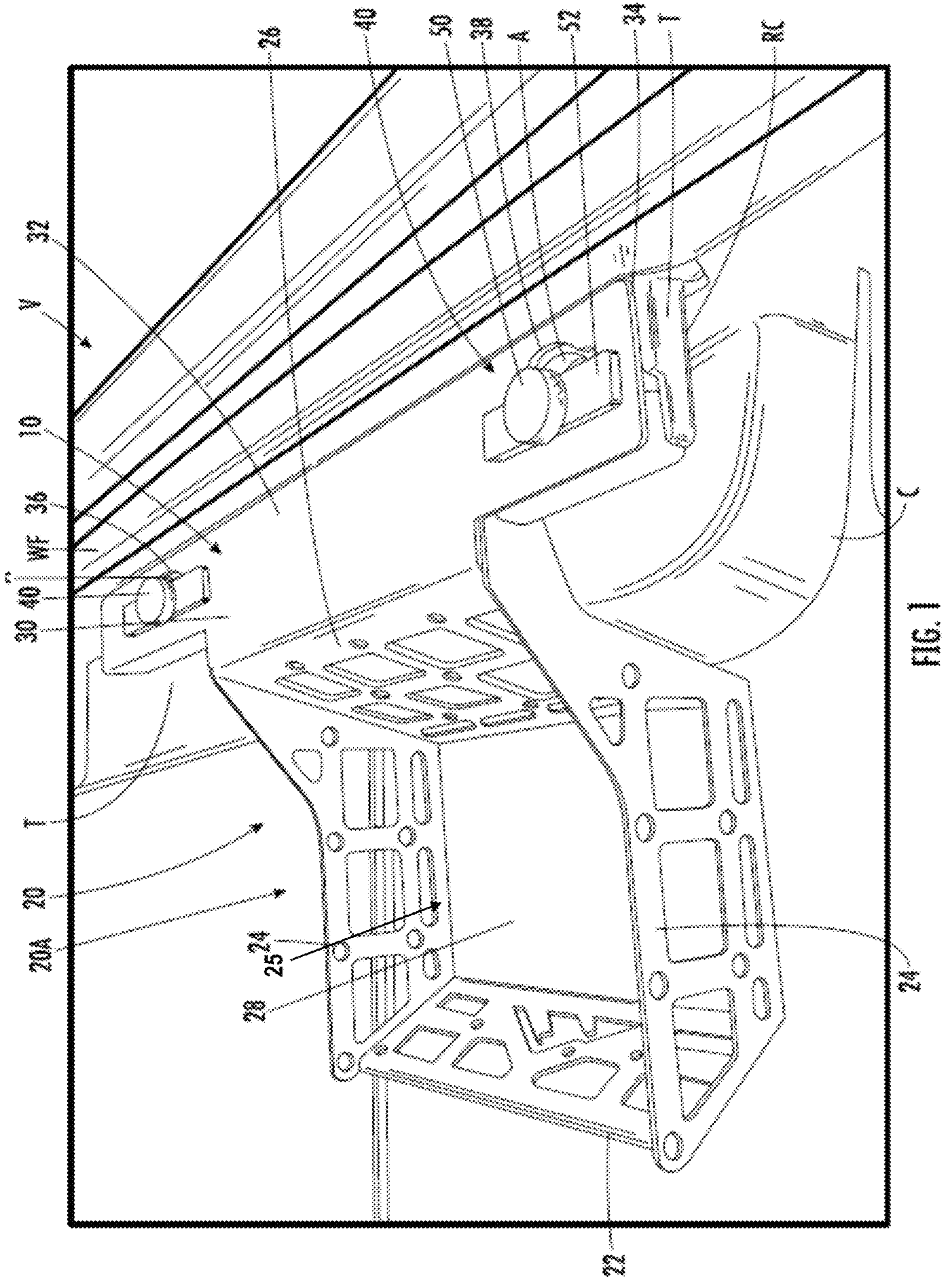
FIG. 1 illustrates a perspective view of an embodiment of an attachment assembly including embodiments of an attachment, or mountable product, and attachment hardware secured to a frame of a windshield of a vehicle according to the present subject matter.

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer, or section. Thus, a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

As used herein, the term a "plurality" means two or more.

As used herein, the terms a "accessory" and its plural form are interchangeable with the phrase "mountable product" and its plural form and can include, but are not limited to, baskets, fire extinguisher holders, light frames, MOLLE panels, radio mount, or the like, that can be mounted to window frames of front windshields of vehicles.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

The present subject matter relates to attachment assemblies and attachment hardware that can be inserted through apertures on tabs that extend from the window frame of a vehicle, such as a Ford Bronco®, above the windshield on either side of the rearview mirror. These pieces of attachment hardware can clamp attachments, i.e., mountable products, such as baskets, holders, lights, light frames, or the like, securely in place in an easily accessible position while using a vehicle's soft top. If a driver wants to use the hard top, the product being used can be held in place by the hard top instead of using the attachment hardware. For example, the mountable product can be a basket used to fill a void where people can put their sunglasses, etc. With some vehicle packages, there are toggle switches put in place where the sunglasses holder normally would be.

Thus, the present disclosure related to attachment assemblies, attachments, and attachment hardware for securing attachments, i.e., mountable products, to window frames of vehicles and related methods. In particular, the present subject matter relates to attachment hardware for securing mountable products such as baskets, fire extinguisher holders, light frames, MOLLE panels, radio mount, or the like, to window frames of front windshields of vehicles. The attachment hardware for securing a mountable product to a window frame for a windshield of a vehicle can comprise a nut and a T-shaped washer comprising a top cross-bar section and a stem section extending downward from the top cross-bar section. The T-shaped washer can have a washer aperture therethrough. The attachment hardware can also comprise a fastener side washer having a washer aperture therethrough and a threaded fastener configured for insertion through the washer aperture of the fastener side washer and the washer aperture of the T-shaped washer and for screwingly engaging the nut. The top cross-bar section and the stem section of the T-shaped washer can be configured to fit through an engagement aperture in a tab extending from a frame of a windshield when turned at an angle to the engagement aperture and have a shape that contacts an upper wall of the tab that defines the engagement aperture when the threaded fastener is tightened in the nut.

The width of the top cross-bar section can be wider than at least a portion of the engagement aperture in the tab. The length of the stem section of the T-shaped washer can be such that, when the threaded fastener is tightened in the nut, the stem section can extend underneath the upper wall of the tab. The T-shaped washer can comprise a crested section that extends opposite the washer aperture and the top cross-bar section. The crested section of the T-shaped washer can comprise a semi-circular section that shares a center of radius with the washer aperture.

The T-shaped washer can be engaged with the nut such that the nut and the T-shaped washer form a combined unit that has a singular body, i.e., a unitary body. In some embodiments, the T-shaped washer can be press fit onto the nut. For example, the nut can have a collar around a threaded nut aperture. The nut can be placed in a nut holder anvil with the nut collar extending upward from the anvil. A punch can then be used to press fit the T-shaped washer onto the collar of the nut.

For installation purposes when mounting a mountable product to the window frame of the vehicle, the threaded fastener can loosely engage the nut such that there is separation between the T-shaped washer and the fastener side washer to provide space for insertion of the T-shaped washer and the nut into the engagement aperture at an angle before the threaded fastener is tightened in the nut. In some embodiments, the fastener side washer can be a partial circular washer having an abbreviated side to facilitate insertion of the nut and the T-shaped washer into the engagement aperture of the tabs of the window frame. In some embodiments, the fastener side washer can be a rectangular washer having a length such that it is longer than at least a portion of the engagement aperture in the tab. The rectangular washer can facilitate insertion of the nut and the T-shaped washer loosely engaged on the threaded fastener into the engagement aperture of the tabs of the window frame. The threaded fastener can comprise a thumb screw or a bolt.

Figure 2:
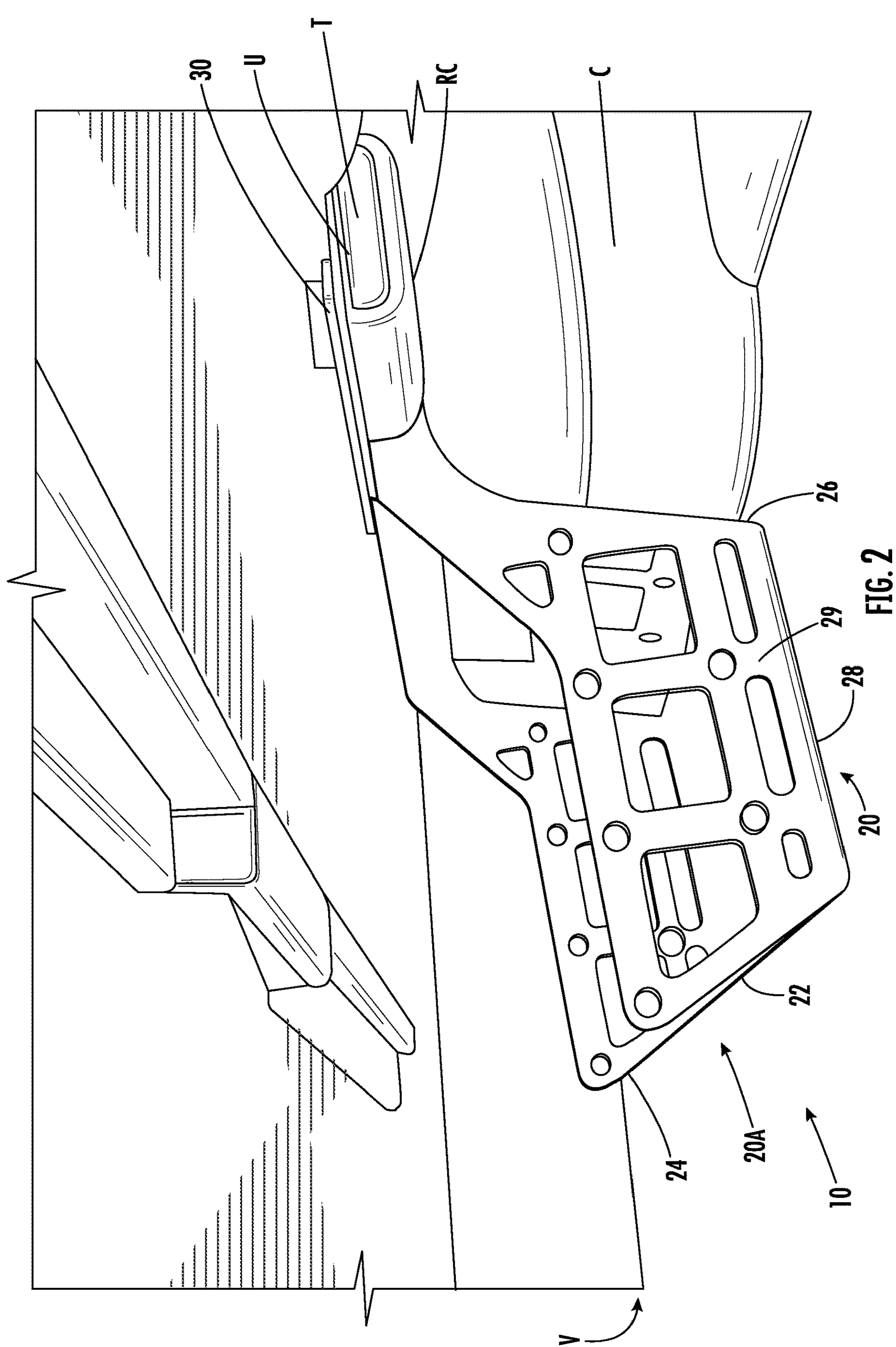
FIG. 2 illustrates a side perspective view of the embodiment of the attachment assembly according to FIG. 1.
Figure 3:
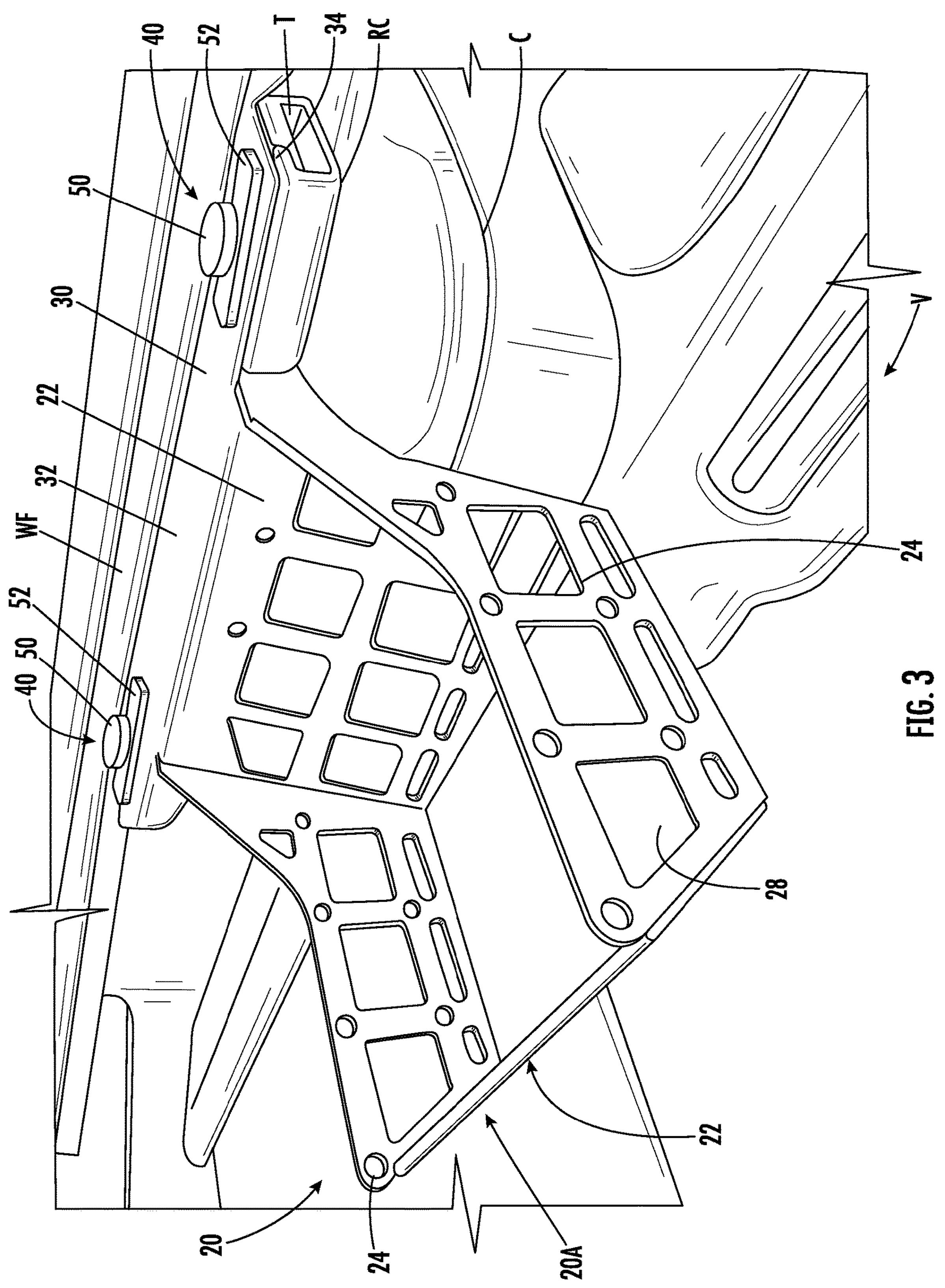
FIG. 3 illustrates another perspective view of the embodiment of the attachment assembly according to FIG. 1.

Referring to FIGS. 1-3, a window frame attachment assembly, general designated 10, is provided that is mounted to tabs T on the frame WF of a windshield of a vehicle V. The window frame attachment assembly 10 can comprise a mountable product 20, which can comprise a variety of different products including, but not limited to, baskets, fire extinguisher holders, mountable lights, light frames, MOLLE panels, radio mount, or the like. For example, as shown in FIGS. 1-3, the mountable product can comprise a basket 20A. The basket 20A can comprise a front wall 22, sidewalls 24, and a rear wall 26. The basket 20A can also comprise a floor 28 that extends between the sidewalls 24 and the front and rear walls 22, 26. The basket 20A can have an opening 25 on top between the sidewalls 24 and the front and rear walls 22, 26 to allow for placement of items into the basket 20A. In some embodiments, the front wall 22 of the basket 20A can be slanted forward forming an obtuse angle with the floor 28 of the basket 20A. The slanted front wall 22 can make insertion and retrieval of items into and from the basket 20A easier and to make the basket 20A more ergonomically accessible, while still providing a wall that holds the items in the basket 20A until their intended retrieval. In some embodiments, the rear wall 26 can be shaped to reside against a portion of the vehicle V. For example, in some embodiments, the rear wall 26 can be shaped to reside against an upper console C of the vehicle V as shown in FIG. 1.

Figure 4:
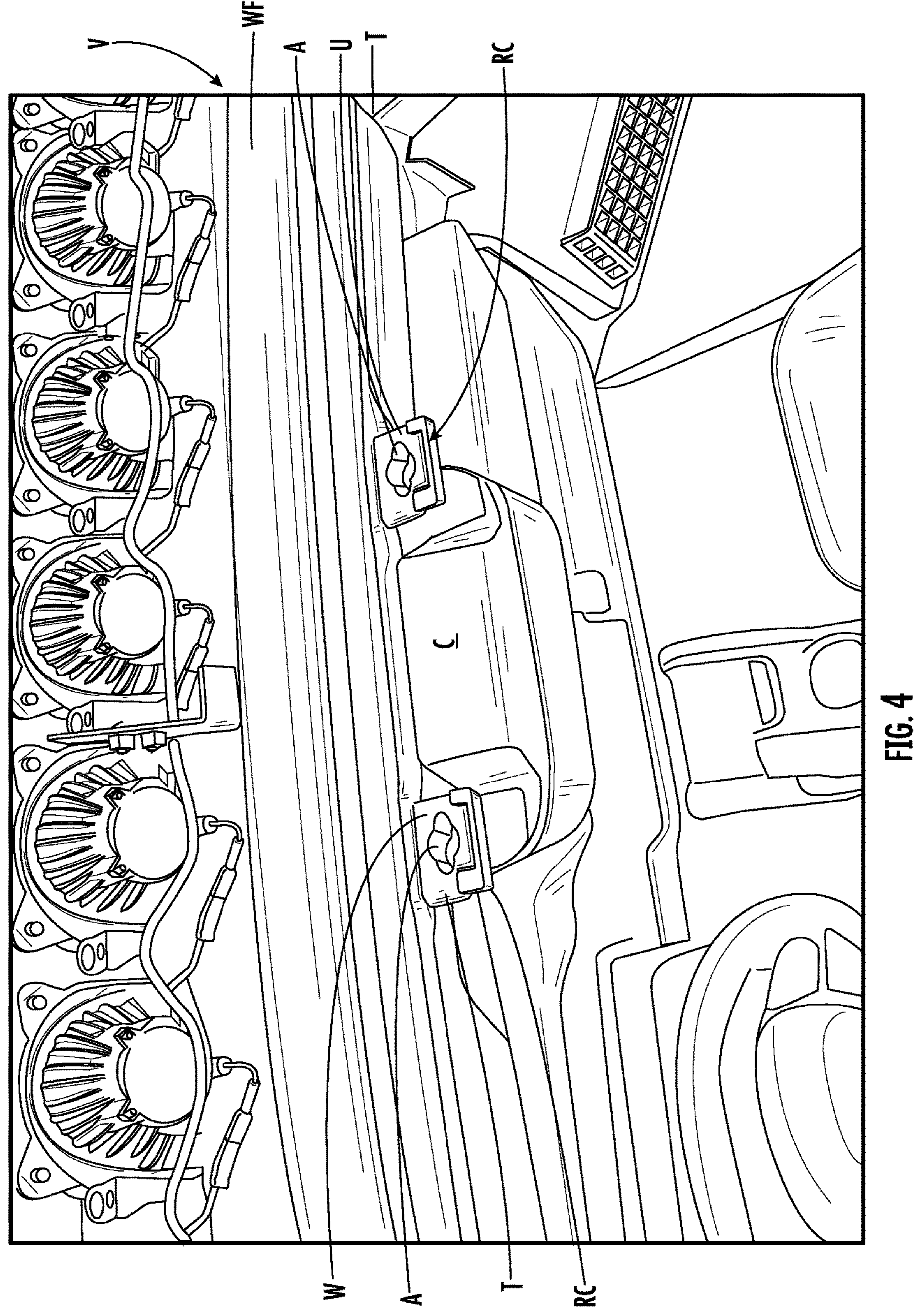
FIGS. 4 and 5 illustrate perspective views of tabs extending from a window frame of a windshield of a vehicle to which embodiments of attachment assemblies that include mountable products and attachment hardware can be secured according to the present subject matter.
Figure 5:
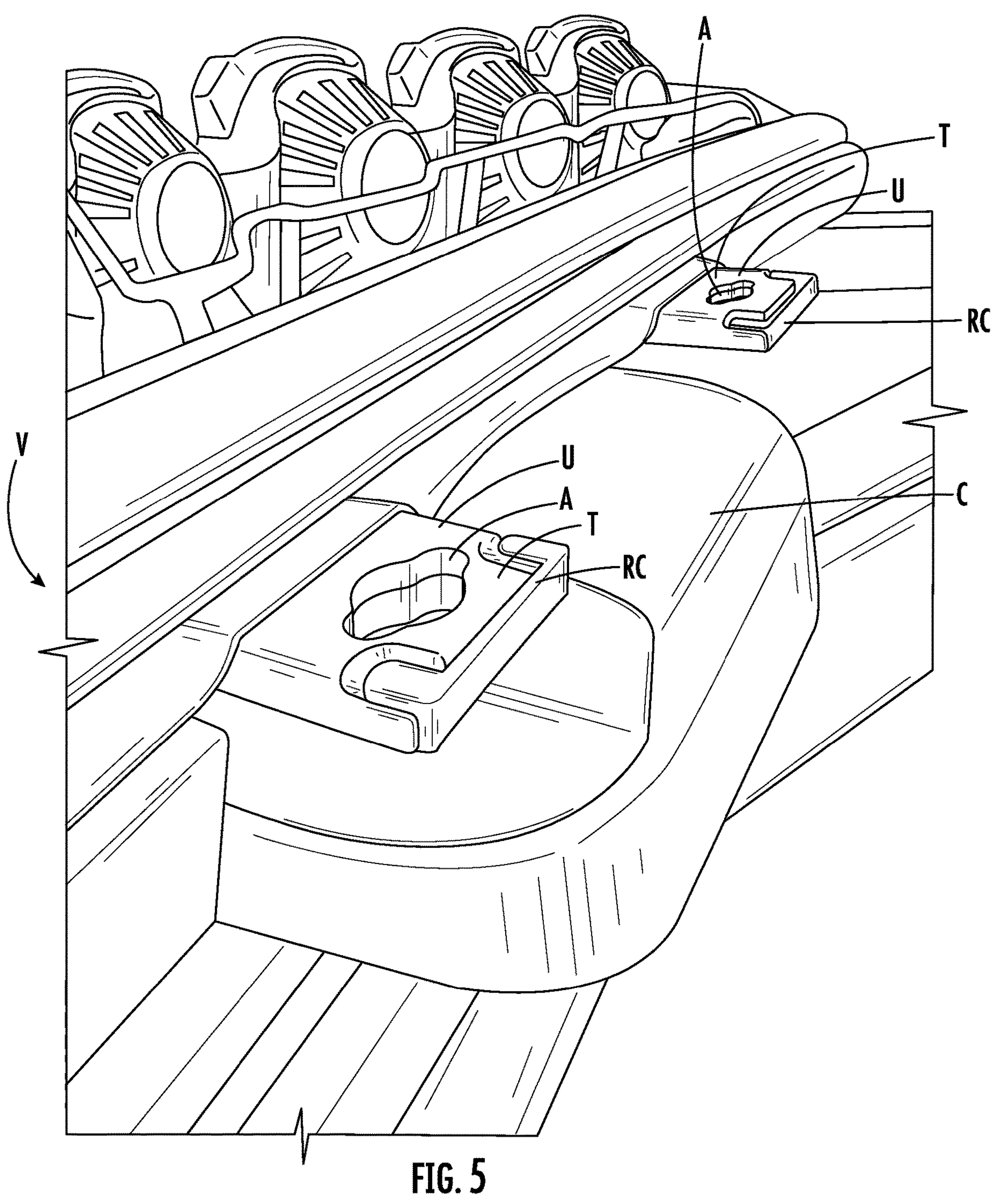

The mountable product 20, as illustrated by the basket 20A, can have a mount 30 for securing the mountable product 20 to the frame WF of a windshield of the vehicle V. For example, in some embodiments, the mount 30 can extend from the rear of the mountable product 20, such as the rear wall 26 as shown in FIGS. 1-3. In some vehicles, such as vehicle V as shown in FIGS. 4 and 5, the vehicle V can have tabs T that extend from a top portion of the window frame WF. The tabs T can have engagement apertures A therein. In some vehicles, the engagement apertures A can be eyelet shaped engagement apertures that are longer than they are wide. In the embodiment shown, the vehicle V is a Ford Bronco® and the tabs T can be useful, for example, for holding a hardtop to the window frame WF. Each of the tabs T can have a removable cup RC that extends below an upper wall U of the respective tab T.

The mount 30 can have a length that allows the mount 30 to extend between the tabs. For example, the mount 30 can have a length that extends to the outer portions of the tabs T so that the mount 30 extends over the engagement apertures A. The mount 30 can have a first side 32 that can face outward and a second side 34 that can face toward the tabs T of the window frame WF when the mountable product 20 is installed on the vehicle V. The mount 30 can have a first receiving aperture 36 that can align with the first engagement aperture A of the first tab T on a first end of the mount 30 and a second receiving aperture 38 that can align with the second engagement aperture A of the second tab T on a second end of the mount 30 when the mountable product 20 is properly aligned with the tabs T. The receiving apertures 36, 38 can have a shape so that the engagement apertures A can be accessible through the receiving apertures 36, 38 of the mount 30. In some embodiments, as shown in FIGS. 1-3 and 8-9, the receiving apertures 36, 38 can have the same shape as the engagement apertures A.

Referring to FIGS. 6A-6F and FIGS. 7A-7C, to hold the mountable product 20 to the window frame WF, the attachment assembly 20 can further comprise attachment hardware 40 for securing the mountable product 20 to the window frame WF for the windshield of the vehicle V. For example, a set of two assemblies of attachment hardware 40 can be used to secure the mountable product 30 to the tabs T of the window frame WF. Since both sets of assemblies are the same, reference will now be made to a single assembly of attachment hardware 40. The attachment hardware 40 can comprise a nut 42 and a T-shaped washer 44 comprising a top cross-bar section 46 and a stem section 48. The stem section 48 can extend downward from the top cross-bar section 46. The T-shaped washer 44 can have a washer aperture 45 therethrough. For example, in some embodiments, the washer aperture 45 can extend through a center section of the top cross-bar section 48 at a position above the stem section 48. The T-shaped washer 44 can be engaged with the nut 42 such that the nut 42 and the T-shaped washer 44 form a combined unit that is a singular body SB. In some embodiments, the T-shaped washer 44 can be press fit onto the nut 42. For example, the nut 42 can have a collar 42A around a threaded nut aperture 42B. A punch can then be used to press fit the T-shaped washer 44 onto the collar 42A of the nut 42.

The attachment hardware 40 can also comprise a threaded fastener 50 which can be a bolt or a thumb screw, for example. Thumb screws can permit easy attachment of the attachment hardware 40 and the mountable product 20 to the vehicle V without special tools. When the threaded fastener 50 is a thumb screw, the threaded fastener 50 can have a knurled knob for easy grip for tightening and loosening the threaded fastener 50.

Further, the attachment hardware 40 can comprise a fastener side washer 52 having a washer aperture 54 therethrough. In some embodiments, the fastener side washer 52 can be a circular washer. In such embodiments, the installation of the attachment hardware 40 can be performed differently. For example, the nut 42 and T-shaped washer 44 can be placed through the respective receiving aperture 36, 38 of the mount 30 of the mountable product 20 and the respective engagement aperture A to reside against the removable cup RC of the tab. The threaded fastener 50 can then engage the nut aperture 42A in the nut 42 through the washer aperture 45 of the T-shaped washer 44 to tighten the attachment hardware 40 within the tab T.

In some embodiments, the fastener side washer 52 can be a partial circular washer having an abbreviated side to facilitate insertion of the nut 42 and the T-shaped washer 44 (that are loosely engaged on the threaded fastener 50) into the receiving apertures 36, 38 of the mount 30 of the mountable product 20 and the engagement aperture A of the tabs T of the window frame WF. In some embodiments, as shown in FIGS. 1-3 and 6A-6F, the fastener side washer 52 can be a rectangular washer having a length such that it is longer than at least a portion of a respective engagement aperture A in a respective tab T. The rectangular washer 52 can facilitate insertion of the nut 42 and the T-shaped washer 44 into the respective engagement aperture A of the respective tab T of the window frame WF when the threaded fastener 50 loosely engage rectangular washer 52, the nut 42 and the T-shaped washer 44 as explained below.

Figure 6B:
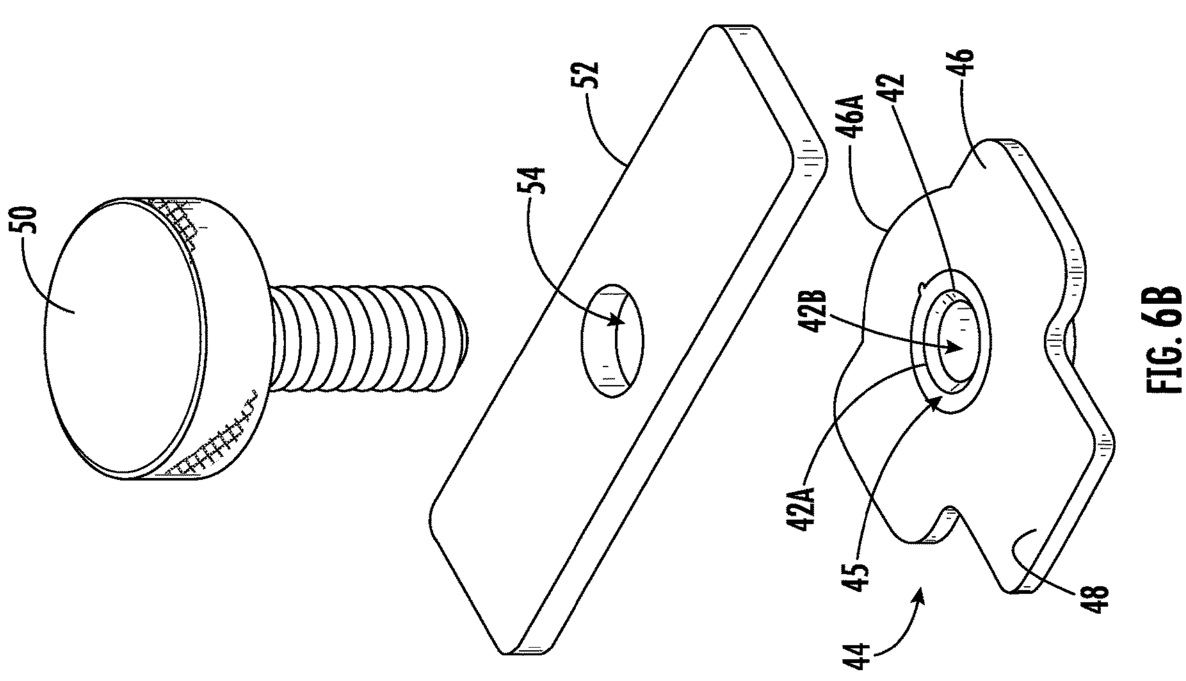
Figure 6A:
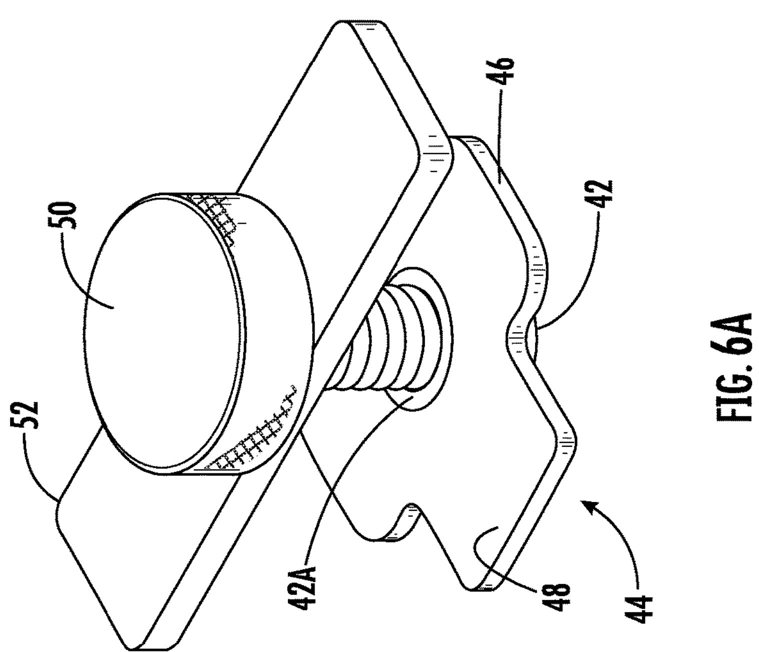
Figures 7A, 7B, 7C:
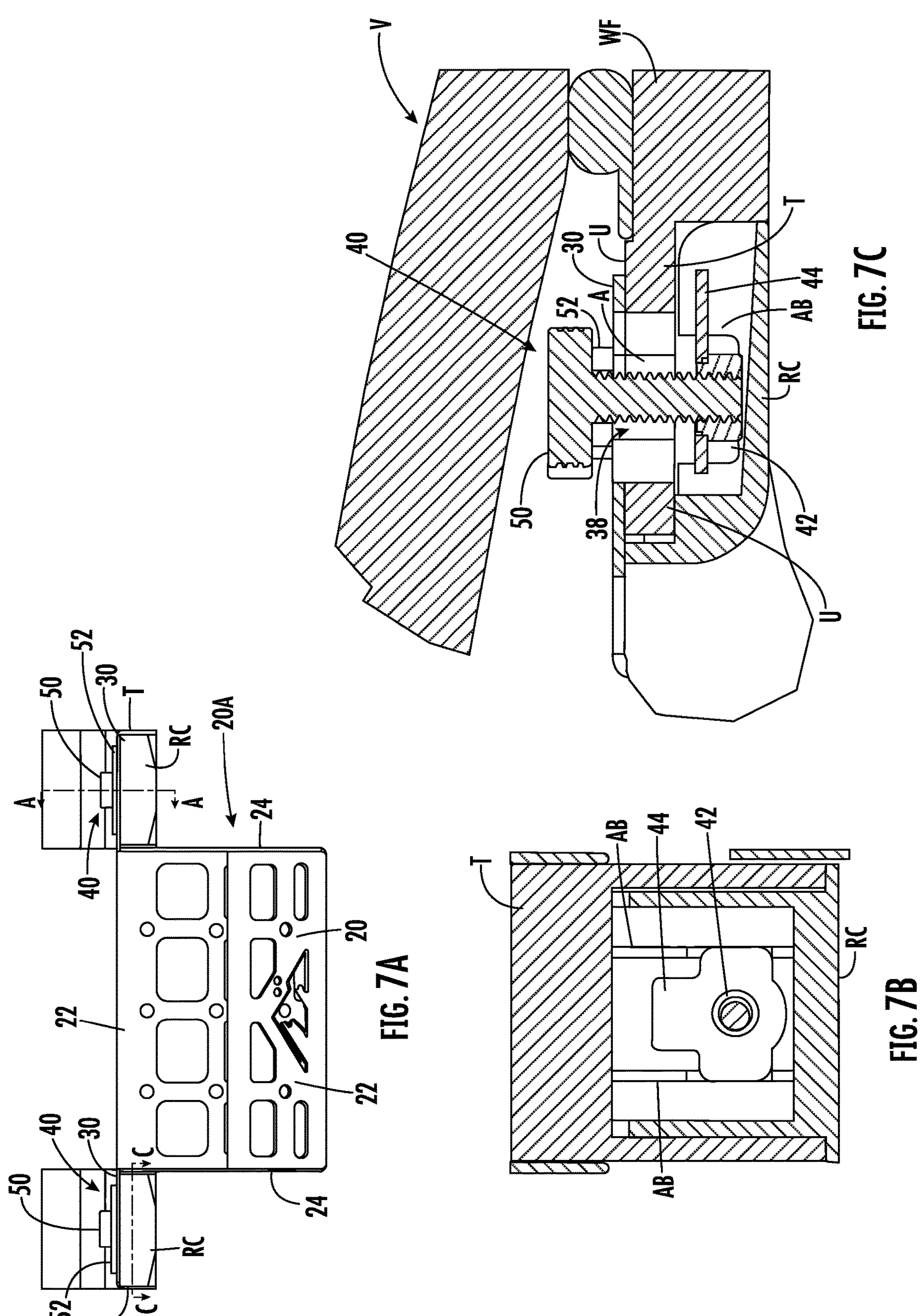
FIG. 7A-7C illustrates different view of an embodiment of an attachment assembly or a portion of an embodiment of an attachment assembly secured to tabs of a window frame according to the present subject matter.
Figure 8:
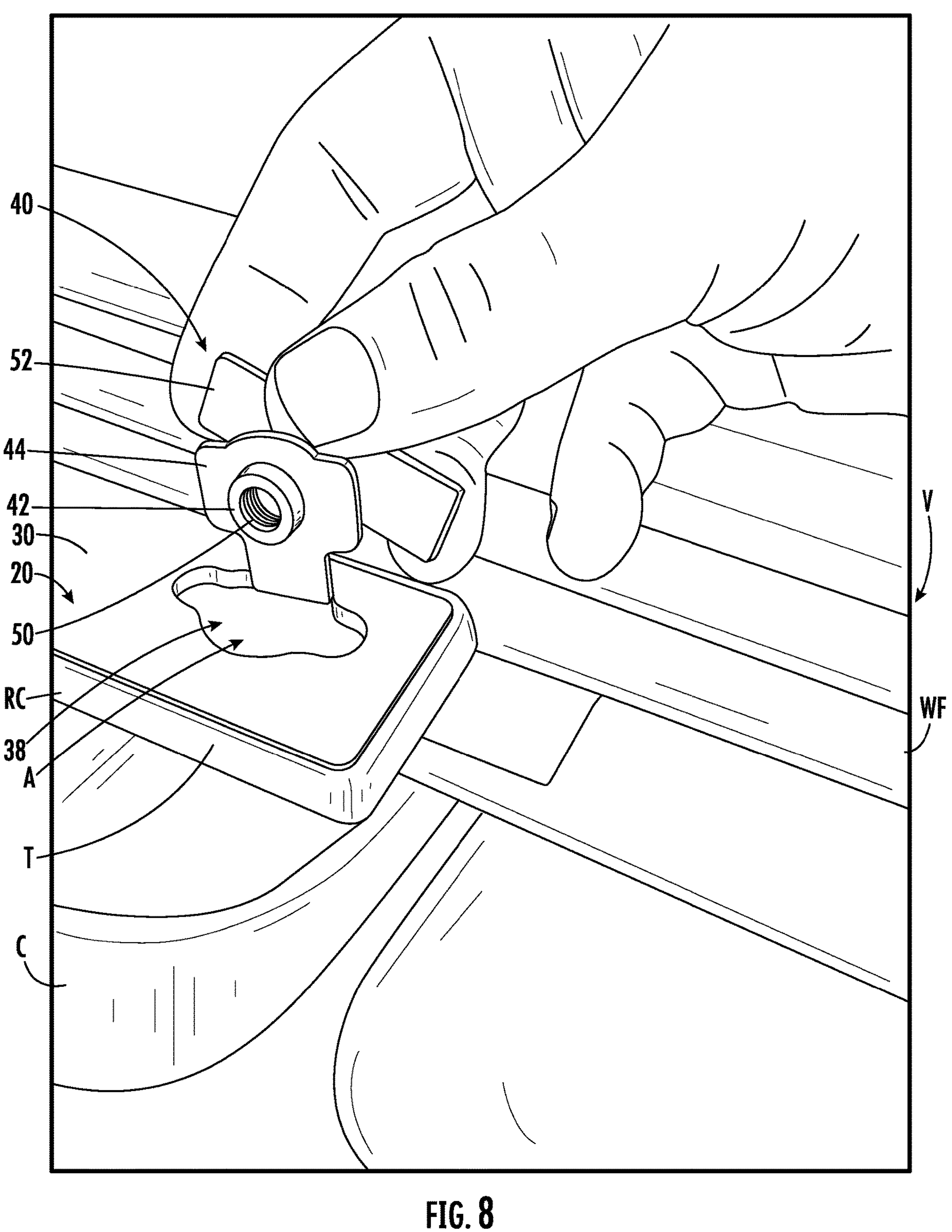
FIG. 8 illustrates a perspective view of an insertion of an embodiment of an attachment hardware through a receiving aperture in a mountable product and an engagement aperture in a tab of a window frame of a vehicle according to the present subject matter.
Figure 9:
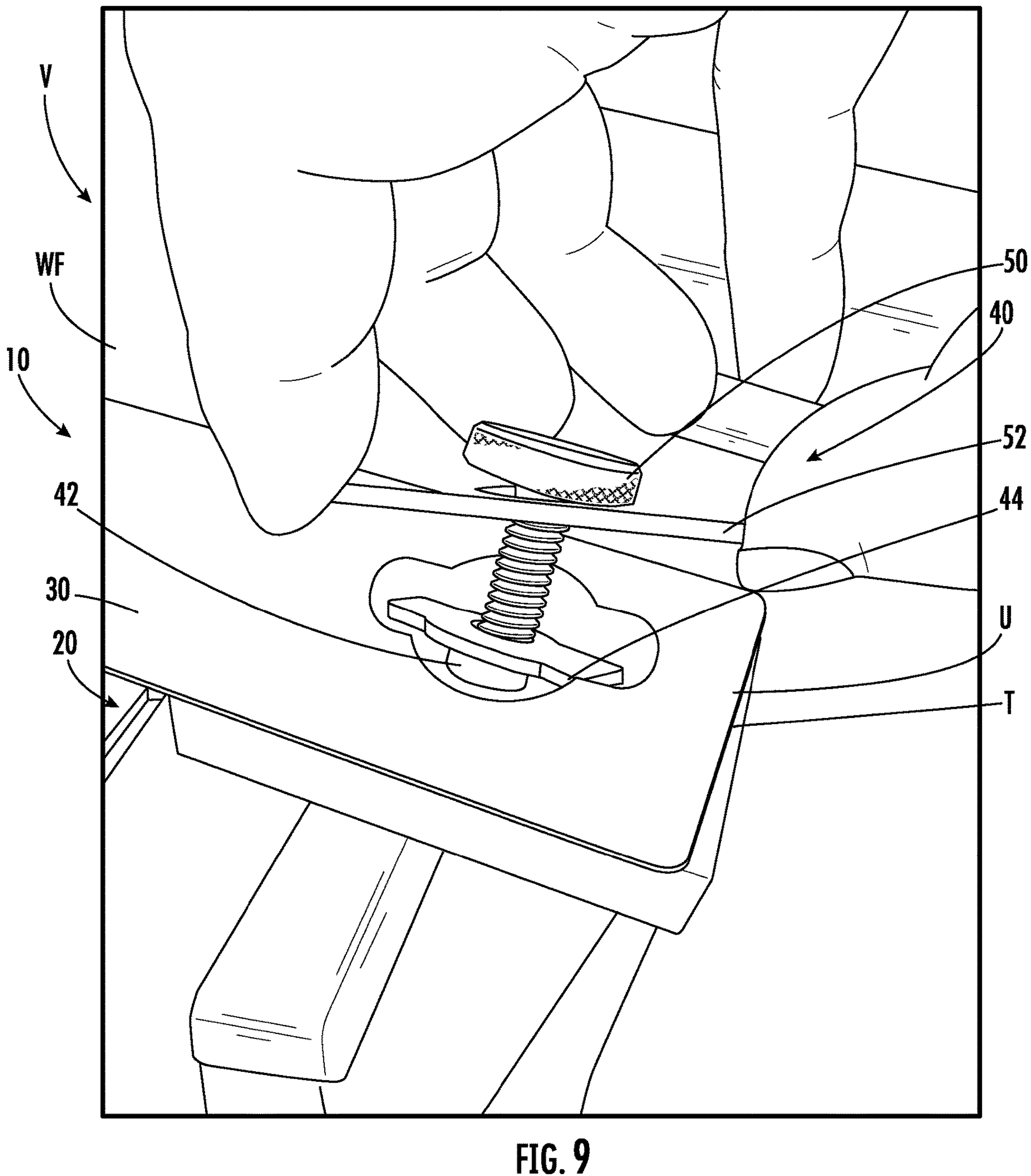
FIG. 9 illustrate a perspective view of the insertion of the embodiment of the attachment hardware according to FIG. 8.
Figure 10:
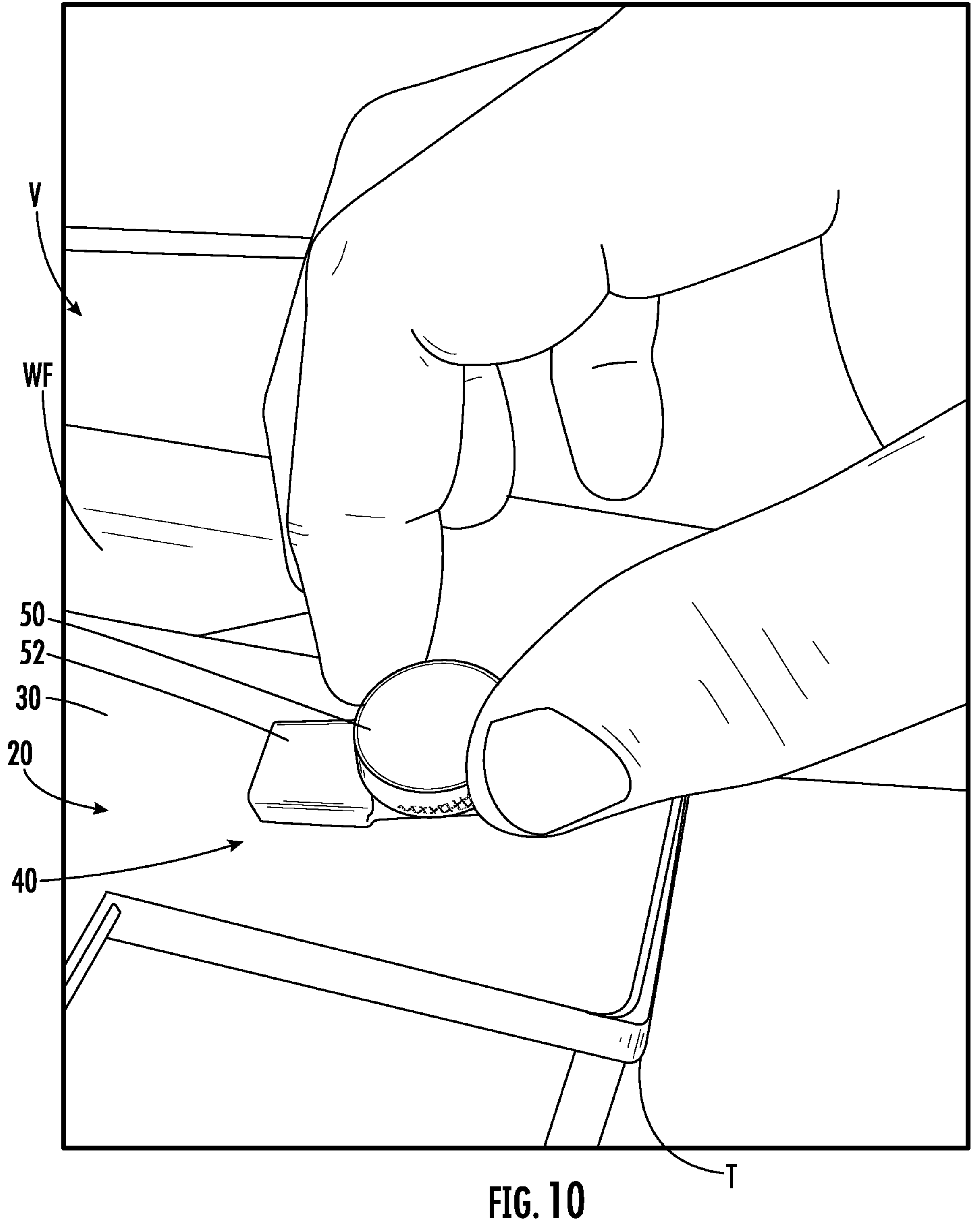
FIG. 10 illustrate a perspective view of the securement of the embodiment of the attachment hardware to the tab of the window frame of the vehicle according to FIG. 8.
Figure 11:
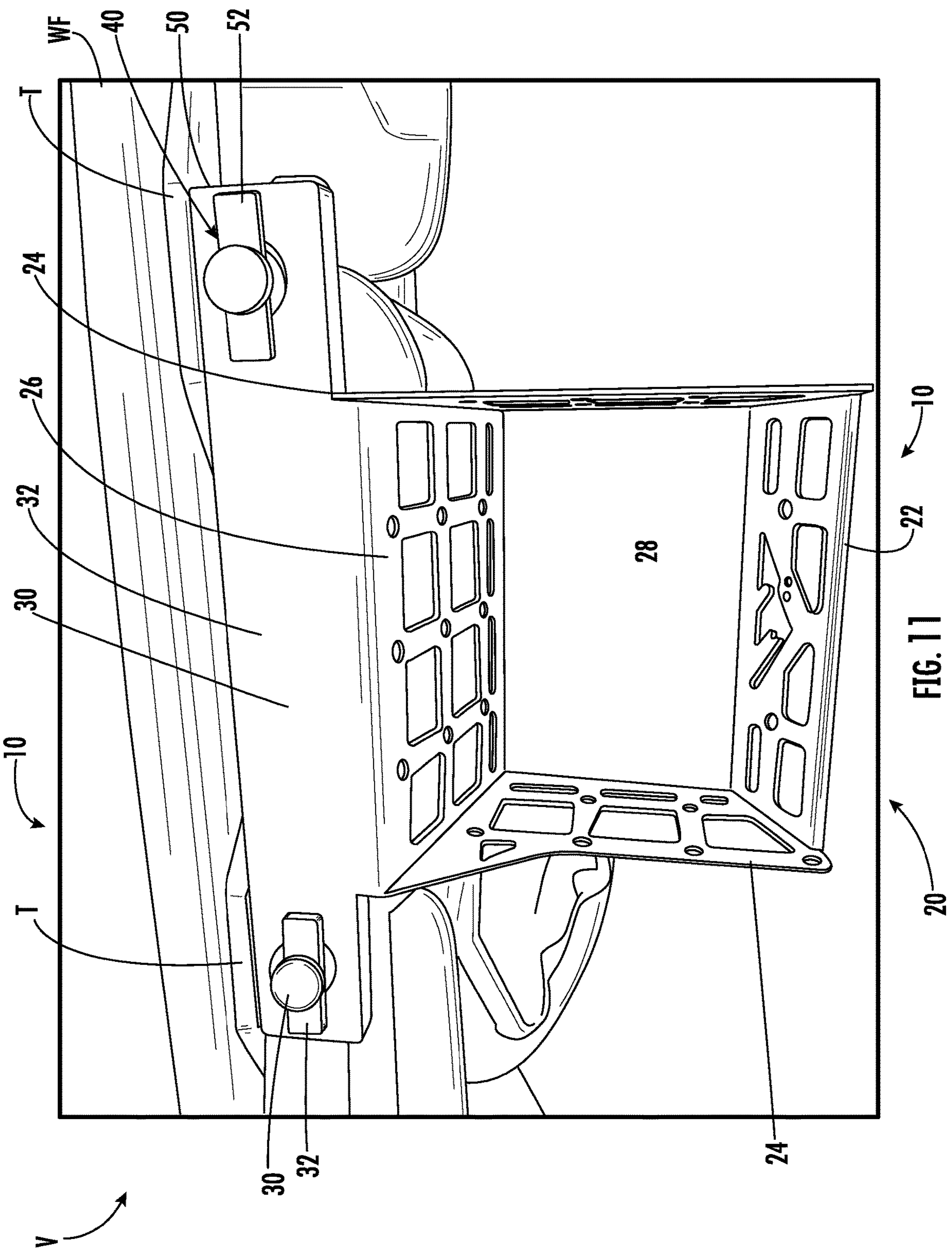
FIG. 11 illustrates a perspective view of an embodiment of an attachment assembly secured to a tab of a window frame of a vehicle according to the present subject matter.

Referring to FIGS. 7A-11, when installing one of the attachment hardware 40, the threaded fastener 50 can be inserted through the washer aperture 54 of the fastener side washer 52 and the washer aperture 45 of the T-shaped washer 44 and can loosely engage the nut 42. For example, as shown in FIG. 6A, the threaded fastener 50 can loosely engage the nut 42 such that there is separation between the T-shaped washer 44 and the fastener side washer 52 to provide space for insertion of the T-shaped washer 44 and the nut 42 into one of the receiving apertures 36, 38 and the corresponding engagement aperture A at an angle before the threaded fastener 50 is tightened on the nut 42. For example, when the mount 30 of the mountable product 20 is properly aligned with the tabs T of the frame WF of the vehicle V as shown in FIGS. 8 and 9, the top cross-bar section and the stem section of the T-shaped washer of the attachment hardware are configured to fit through both the corresponding receiving aperture 36 of the mount 30 on the mountable product 20 and the corresponding engagement aperture A in the respective tab T when the attachment hardware 40 is turned at an angle to the engagement aperture A. As shown in FIG. 7C, once the nut 42 and the T-shaped washer 44 have passed through the corresponding receiving aperture 36 of the mount 30 on the mountable product 20 and the corresponding engagement aperture A in the respective tab T, the threaded fastener 50 can be tightened in the nut 42 so that the attachment hardware 40 can hold the mounted product 20 to the tab T as shown in FIG. 10 and represented in FIG. 7C. The T-shaped washer 44 can have a shape that contacts an upper wall U of the tab T that defines the engagement aperture A when the threaded fastener 50 is fully tightened in the nut 42.

For example, the top cross-bar section 46 and the stem section 48 of the T-shaped washer 44 can be shaped such that the top cross-bar section 46 can form a wide but relatively short top portion of the T-shape and the stem section 48 can have a length that extend downward from the top cross-bar section 46 that is short enough in combination with the width of the top cross-bar section 46 to enter either of the receiving apertures 36, 38 in the mount 30 of the mountable product 20 and the corresponding engagement aperture A in the respective tab T of the frame WF. For instance, the top cross-bar section 46 of the T-shaped washer 44 can have a width that is wider than at least a portion of the engagement aperture A in the tab T. The length of the stem section 48 of the T-shaped washer 44 is such that when the threaded fastener 50 is tightened in the nut 42 when the attachment hardware has engaged the tab T, the stem section 48 extends underneath a portion of the upper wall U of the tab T.

In some embodiments as shown in FIGS. 6A-6F, the T-shaped washer 44 can comprise a crested section 46A extending from the top cross-bar section 46 of the T-shaped washer 44 around the washer aperture 45. The crested section 46A of the T-shaped washer 44 can comprise a semi-circular section that shares a center of radius with the washer aperture 45. The crested section 46A can add strength to the T-shaped washer 44 around the washer aperture 45. The crested section 46A can also make the formation of the washer aperture 45 easier.

Thus, as disclosed herein, a method for securing a mountable product to a window frame for a windshield of a vehicle can also be provided as described above. For example, in some embodiments, the method can include providing a mountable product as described above with the mountable product comprising a mount having one or more receiving apertures therein. The method can also comprise providing attachment hardware corresponding to the one or more receiving apertures as described above. For example, each of the attachment hardware can comprise a nut and a T-shaped washer. The T-shaped washer can comprise a top cross-bar section and a stem section extending downward from the top cross-bar section. The T-shaped washer can have a washer aperture therethrough. Each of the attachment hardware can also comprise a fastener side washer having a washer aperture therethrough and a threaded fastener configured for insertion through the washer aperture of the fastener side washer and the washer aperture of the T-shaped washer and for screwingly engaging the nut. The method can comprise aligning the one or more receiving apertures in the mount of the mountable product with an engagement aperture in a tab extending from a frame of a windshield of a vehicle. Additionally, the method can comprise inserting the top cross-bar section and the stem section of the T-shaped washer of each of the attachment hardware at an angle through one of the one or more receiving apertures of the mount on the mountable product and the corresponding engagement aperture in the respective tab when the mount of the mountable product is properly aligned with the tabs of the frame of the vehicle. Further, the method can comprise tightening the nut on the threaded fastener such that the T-shaped washer of each of the attachment hardware contacts an upper wall of the tab that defines the engagement aperture.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only, and is not intended to limit the present subject matter.

What is claimed is:

1. An attachment hardware for securing a mountable product to a window frame for a windshield of a vehicle, the attachment hardware comprising:

a nut;

a T-shaped washer comprising a top cross-bar section and a stem section extending downward from the top cross-bar section, the T-shaped washer having a washer aperture therethrough;

a fastener side washer having a washer aperture therethrough; and a threaded fastener configured for insertion through the washer aperture of the fastener side washer and the washer aperture of the T-shaped washer and for screwingly engaging the nut; and the top cross-bar section and the stem section of the T-shaped washer configured to fit through an engagement aperture in a tab extending from a frame of a windshield and having a shape that contacts an upper wall of the tab that defines the engagement aperture when the threaded fastener is tightened in the nut.

2. The attachment hardware according to claim 1, wherein the top cross-bar section of the T-shaped washer has a width that is wider than at least a portion of the engagement aperture in the tab.

3. The attachment hardware according to claim 2, wherein the length of the stem section of the T-shaped washer is such that, when the threaded fastener is tightened in the nut, the stem section extends underneath at least a portion of the upper wall of the tab such that the top cross-bar section and stem section of the t-shaped washer contact an underside of the upper wall of the tab and the fastener side washer contact an outer side of the upper wall of the tab.

4. The attachment hardware according to claim 1, wherein the T-shaped washer comprises a crested section extending from the top cross-bar section of the attachment hardware around the washer aperture.

5. The attachment hardware according to claim 4, wherein the crested section of the T-shaped washer comprises a semi-circular section that shares a center of radius with the washer aperture.

6. The attachment hardware according to claim 1, wherein the T-shaped washer and the nut are a combined unit such that the nut and the T-shaped washer form a singular body.

7. The attachment hardware according to claim 6, wherein the threaded fastener loosely engages the nut such that there is separation between the T-shaped washer and the fastener side washer to provide space for insertion of the T-shaped washer and the nut into the engagement aperture at an angle before the threaded fastener is tightened in the nut.

8. The attachment hardware according to claim 7, wherein the fastener side washer is a rectangular washer having a length that is longer than at least a portion of the engagement aperture in the tab.

9. The attachment hardware according to claim 1, wherein the threaded fastener comprises a thumb screw or a bolt.

10. The attachment hardware according to claim 1, wherein the T-shaped washer and the nut are press fitted together to form a singular body.

11. A window frame attachment assembly for securing to a window frame for a windshield of a vehicle, the attachment assembly comprising:

a mountable product comprising a mount having one or more receiving apertures therein each of which is alignable with an engagement aperture in a tab extending from a frame of a windshield of a vehicle;

attachment hardware corresponding to the one or more receiving apertures, each of the attachment hardware comprising:

a nut;

a T-shaped washer comprising a top cross-bar section and a stem section extending downward from the top cross-bar section, the T-shaped washer having a washer aperture therethrough;

a fastener side washer having a washer aperture therethrough; and a threaded fastener configured for insertion through the washer aperture of the fastener side washer and the washer aperture of the T-shaped washer and for screwingly engaging the nut; and when the mount of the mountable product is properly aligned with the tabs of the frame of the vehicle, the top cross-bar section and the stem section of the T-shaped washer of each of the attachment hardware being configured to fit through one of the one or more receiving apertures of the mount on the mountable product and the corresponding engagement aperture in the respective tab with the T-shaped washer of each of the attachment hardware having a shape that contacts an upper wall of the tab that defines the engagement aperture when the threaded fastener is tightened in the respective nut.

12. The attachment assembly according to claim 11, wherein the mountable product comprises a basket.

13. The attachment assembly according to claim 12, wherein the basket comprises a slanted front wall.

14. The attachment assembly according to claim 11, wherein the width of the top cross-bar section of the T-shaped washer of the attachment hardware is wider than at least a portion of the engagement aperture in the tab.

15. The attachment assembly according to claim 14, wherein the length of the stem section of the T-shaped washer of the attachment hardware is such that when the threaded fastener is tightened in the nut, the stem section extends underneath at least a portion of the upper wall of the tab.

16. The attachment assembly according to claim 11, wherein the T-shaped washer of the attachment hardware comprises a crested section extending from the top cross-bar section of the attachment hardware around the washer aperture.

17. The attachment assembly according to claim 16, wherein the crested section of the T-shaped washer of the attachment hardware comprises a semi-circular section that share a center of radius with the washer aperture.

18. The attachment assembly according to claim 11, wherein the T-shaped washer and the nut are a combined unit such that the nut and the T-shaped washer form a singular body.

19. The attachment assembly according to claim 18, wherein the threaded fastener of the attachment hardware loosely engages the nut such that there is separation between the T-shaped washer and the fastener side washer to provide space for insertion of the T-shaped washer and the nut into the receiving aperture of the mountable product and the engagement aperture at an angle before the threaded fastener is tightened in the nut.

20. The attachment assembly according to claim 19, wherein the fastener side washer of the attachment hardware is a rectangular washer having a length such that longer than at least a portion of the engagement aperture in the tab.

21. The attachment assembly according to claim 11, wherein the T-shaped washer and the nut of the attachment hardware are press fitted together to form a singular body.

22. A method for securing a mountable product to a window frame for a windshield of a vehicle, the method comprising:

providing a mountable product comprising a mount having one or more receiving apertures therein;

providing attachment hardware corresponding to the one or more receiving apertures, each of the attachment hardware comprising:

a nut;

a T-shaped washer comprising a top cross-bar section and a stem section extending downward from the top cross-bar section, the T-shaped washer having a washer aperture therethrough;

a fastener side washer having a washer aperture therethrough; and a threaded fastener configured for insertion through the washer aperture of the fastener side washer and the washer aperture of the T-shaped washer and for screwingly engaging the nut; and aligning the one or more receiving apertures in the mount of the mountable product with an engagement aperture in a tab extending from a frame of a windshield of a vehicle;

inserting the top cross-bar section and the stem section of the T-shaped washer of each of the attachment hardware at an angle through one of the one or more receiving apertures of the mount on the mountable product and the corresponding engagement aperture in the respective tab when the mount of the mountable product is properly aligned with the tabs of the frame of the vehicle; and tightening the nut on the threaded fastener such that the T-shaped washer of each of the attachment hardware contacts an upper wall of the tab that defines the engagement aperture.

* * * * *